United States Patent
Michaud et al.

(10) Patent No.: US 9,642,227 B2
(45) Date of Patent: May 2, 2017

(54) EXTENDING SERVICE LIFE OF LIGHTING FIXTURES

(75) Inventors: Serge Michaud, Brossard (CA); Radu-Cornel Rapeanu, Mont-Royal (CA); Leanthang Sanga, Boisbriand (CA); Zhi Gang Xing, Pointe Claire (CA)

(73) Assignee: Thomas & Betts International LLC, Wilmington, DE (US)

( * ) Notice: Subject to any disclaimer, the term of this patent is extended or adjusted under 35 U.S.C. 154(b) by 766 days.

(21) Appl. No.: 13/160,637

(22) Filed: Jun. 15, 2011

(65) Prior Publication Data

US 2011/0309747 A1 Dec. 22, 2011

Related U.S. Application Data

(60) Provisional application No. 61/356,119, filed on Jun. 18, 2010.

(51) Int. Cl.
| | |
|---|---|
| *H05B 33/08* | (2006.01) |
| *H05B 41/285* | (2006.01) |
| *H05B 41/292* | (2006.01) |
| *H05B 37/03* | (2006.01) |
| *H05B 37/02* | (2006.01) |

(52) U.S. Cl.
CPC .......... *H05B 37/0281* (2013.01); *Y02B 20/42* (2013.01)

(58) Field of Classification Search
CPC .......... G08B 7/062; G08B 7/064; H01K 9/08; H05B 37/029; H05B 37/04; H05B 33/0842

USPC .................................................... 315/86, 211
See application file for complete search history.

(56) References Cited

U.S. PATENT DOCUMENTS

| | | | |
|---|---|---|---|
| 1,713,752 A | 5/1929 | Eckhardt et al. | |
| 1,717,283 A | 6/1929 | Van Horn et al. | |
| 1,859,661 A | 5/1932 | Falge | |
| 1,946,570 A | 2/1934 | Beidler | |
| 2,161,443 A | 6/1939 | Warshawsky | |
| 2,275,838 A * | 3/1942 | Blosser | B61L 23/168 246/34 A |
| 3,486,068 A | 12/1969 | Dunn et al. | |
| 4,117,454 A * | 9/1978 | Fabry | B60Q 1/46 340/331 |
| 4,700,110 A | 10/1987 | McNair et al. | |
| 4,841,196 A | 6/1989 | Waymouth | |
| 4,862,038 A | 8/1989 | Morten | |
| 4,985,662 A | 1/1991 | Willcocks et al. | |
| 5,023,515 A | 6/1991 | Olon et al. | |
| 5,061,879 A | 10/1991 | Munoz et al. | |
| 5,257,020 A * | 10/1993 | Morse | B60Q 7/02 340/471 |
| 5,296,783 A | 3/1994 | Fischer | |
| 6,127,772 A | 10/2000 | Carlson | |

(Continued)

*Primary Examiner* — Dedei K Hammond
(74) *Attorney, Agent, or Firm* — Taft Stettinius & Hollister LLP (57) ABSTRACT

A device may include a power source, two or more lamps for providing light, and a controller. The controller may be configured to periodically select a first combination of one or more of the lamps, provide power from the power source to the first combination of the lamps, select a second combination of one or more of the lamps, and switch the power from the first combination of the lamps to the second combination of the one or more of the lamps after a period of time has elapsed.

22 Claims, 6 Drawing Sheets

(56) References Cited

U.S. PATENT DOCUMENTS

| | | | |
|---|---|---|---|
| 6,281,631 B1 | 8/2001 | Schaffer et al. | |
| 6,364,498 B1 | 4/2002 | Burbank | |
| 6,583,536 B1 | 6/2003 | Gibboney, Jr. | |
| 6,606,808 B2 | 8/2003 | Katz | |
| 6,817,723 B1* | 11/2004 | May | 353/85 |
| 6,843,010 B2 | 1/2005 | Robinson et al. | |
| 6,848,798 B1 | 2/2005 | Logan et al. | |
| 7,114,840 B2 | 10/2006 | Hamrick | |
| 7,501,768 B2 | 3/2009 | Lane et al. | |
| 7,520,072 B2* | 4/2009 | Yu | F21V 23/04 307/66 |
| 7,626,507 B2* | 12/2009 | LaCasse | 340/577 |
| 8,970,115 B2* | 3/2015 | Myers | H05B 37/038 315/122 |
| 2003/0227257 A1* | 12/2003 | Serizawa | H05B 33/0893 315/77 |
| 2007/0152808 A1* | 7/2007 | LaCasse | 340/524 |
| 2008/0080168 A1* | 4/2008 | Harris | F21S 8/00 362/101 |
| 2008/0224849 A1* | 9/2008 | Sirhan | 340/521 |
| 2008/0238345 A1* | 10/2008 | Jaan | F21S 9/037 315/325 |
| 2009/0051506 A1* | 2/2009 | Hicksted | B60Q 1/2611 340/332 |
| 2010/0134027 A1* | 6/2010 | Summerford | H05B 41/042 315/210 |
| 2011/0085416 A1* | 4/2011 | Sallas | G01V 1/005 367/38 |
| 2013/0241417 A1* | 9/2013 | Sakuma | H05B 37/034 315/131 |

* cited by examiner

EXTENDING SERVICE LIFE OF LIGHTING FIXTURES

RELATED APPLICATION

This application claims priority under 35 U.S.C. §119 based on U.S. Provisional Patent Application No. 61/356,119 filed Jun. 18, 2010, the disclosure of which is incorporated by reference herein in its entirety.

BACKGROUND INFORMATION

For some lighting fixtures (e.g., exit sign lights, outdoor lamps, store-front sign lights, etc.), the service life of light sources (e.g., thousands of hours to over 100,000 hours) within the fixtures affects the frequency of maintenance work necessary to eliminate or reduce their downtime. As a result, the service life impacts various costs that are associated with the upkeep of the lighting fixtures. For example, in some instances, the failure of a light source within a fixture requires a replacement of the fixture, even when 90% of the components are still in excellent working condition. This not only increases waste, but also goes against public policies that favor a greener environment.

BRIEF DESCRIPTION OF THE DRAWINGS

The accompanying drawings, which are incorporated in and constitute a part of this specification, illustrate one or more embodiments described herein and, together with the description, explain the embodiments. In the drawings.

DETAILED DESCRIPTION OF PREFERRED EMBODIMENTS

The following detailed description refers to the accompanying drawings. The same reference numbers in different drawings may identify the same or similar elements. As used herein, the term "lighting fixture" may include one or more of the following: devices/components for generating artificial light and for providing illumination; a housing for the devices/components; and any additional circuitry for powering and/or controlling the devices/components.

As described herein, a power-cycling multi-lamp (PCML) lighting fixture may include a control circuit and multiple lamps. The control circuit may periodically and selectively switch power, in turn, to different combinations of the lamps.

In contrast to lighting fixtures with irreplaceable lamps, when all of the lamps in the PCML lighting fixture fail, the PCML lighting fixture is not thrown away. Rather, the lamps are switched to the parallel lamps until the end of their life. In addition, by using the multiple lamps, the PCML lighting fixture may extend the time for which the fixture stays lit at an appropriate luminance level, and therefore, may reduce the frequency of maintenance work (e.g., change a light bulb).

In a conventional multi-lamp lighting fixture, a lamp is lit when the previously lit lamp burns out or dims in intensity. In such a device, a particular lamp in the fixture may operate in a dimly lit or flickering state for an extended period of time (e.g., during 40% of its rated life) until the lamp fails and the next lamp is lit. This may repeat for each of the lamps. However, the owner of the building in which the lighting fixture is installed may delay servicing the lighting fixture until all of the lamps fail. This may allow the lighting fixture to provide sub-standard lighting/signage. In contrast, a PCML lighting fixture, by continuously cycling power through different combinations of lamps in the fixture, may allow each of the lamps to degrade gracefully and gradually, before the next scheduled maintenance work.

Figure 1A:
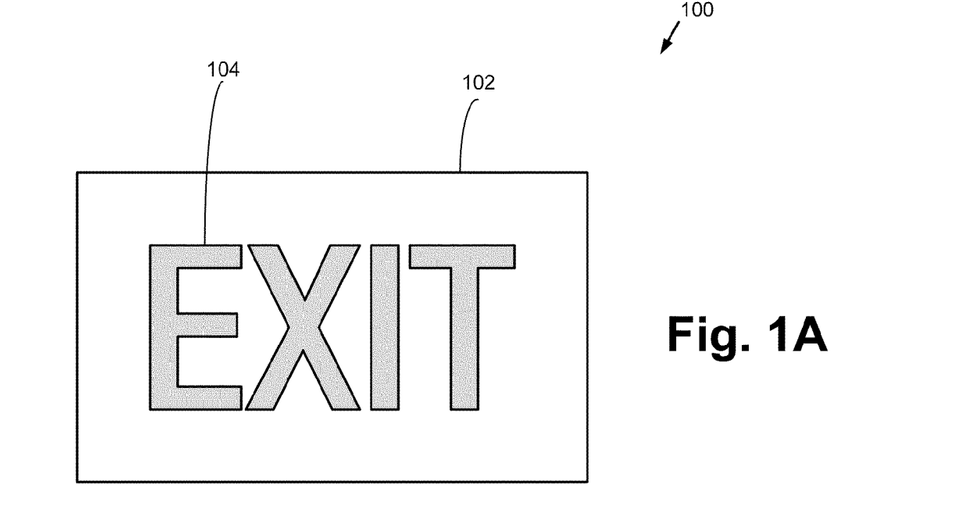
FIG. 1A illustrates an exemplary power-cycling multi-lamp (PCML) lighting fixture in which concepts described here may be implemented according to one implementation.

FIG. 1A illustrates an exemplary PCML lighting fixture 100 in which concepts described herein may be implemented. In this embodiment, PCML lighting fixture 100 may take the form of an EXIT sign 100 (e.g., emergency light). As shown, PCML lighting fixture 100 may include housing 102, sign face 104, and electronic device components (not shown in FIG. 1A). Depending on the implementation, PCML lighting fixture 100 may include additional, fewer, or different components than those illustrated in FIG. 1A and described herein.

Housing 102 may contain the components of PCML lighting fixture 100 and protect the components from outside forces, elements, etc. In addition, housing 102 may provide a frame and/or surface to which the components may be affixed/attached.

Figure 1B:
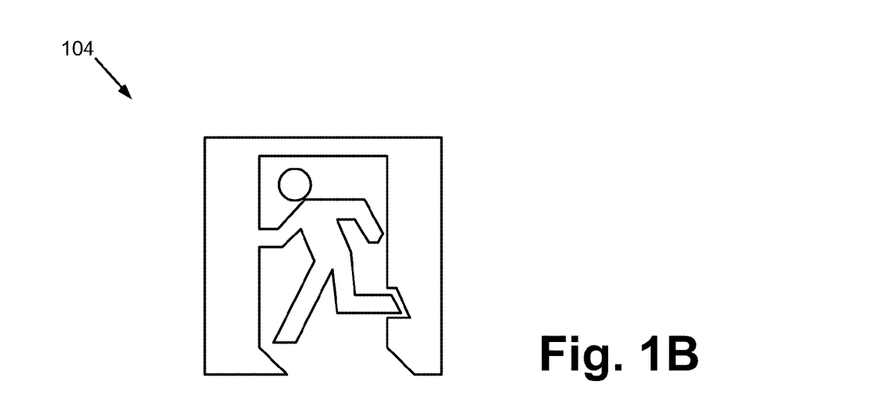
FIG. 1B depicts an exemplary sign face of the PCML lighting fixture of FIG. 1A according to another implementation.

Sign face 104 may provide a surface through which light from within PCML lighting fixture 100 may be emitted to a viewer. In FIG. 1A, sign face 104 is shown in, but not limited to, the form of word "EXIT." FIG. 1B depicts sign face 104 of FIG. 1A according to another implementation. In FIG. 1B, sign face 104 includes a pictogram (e.g., of a person running toward an exit) that is placed over a translucent material. In other implementations, sign face 104 may include other shapes or pictograms, such as a wheelchair, red cross, text, etc.

In FIG. 1A and/or FIG. 1B, most or all of the front surface may be illuminated, and not only the legend (e.g., letters, 'EXIT' in different color, etc.) or the pictogram.

Figure 2A:
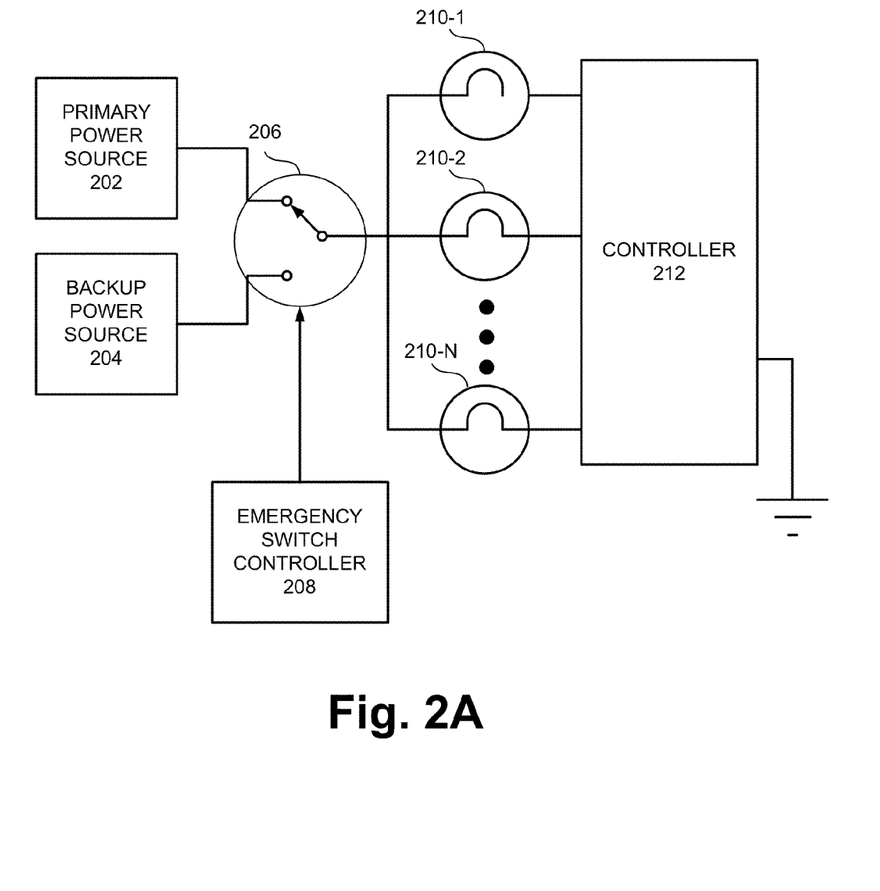
FIG. 2A is a diagram of exemplary functional components of the PCML lighting fixture of FIG. 1A according to one implementation.

FIG. 2A is a diagram of exemplary functional components of PCML lighting fixture 100 according to one implementation. As shown, PCML lighting fixture 100 may include a primary power source 202, backup power source 204, switch 206, emergency switch controller 208, lamps 210-1 through 210-N (referred to individually as "lamp 210" and collectively as "lamps 210"), and controller 212. Depending on the implementation, PCML lighting fixture 100 may include additional, fewer, different, or different arrangement of components than those shown in FIG. 2A. For example, in some implementations, PCML lighting fixture 100 may not include backup power source 204, switch 206, and/or emergency switch controller 208.

Primary power source 202 may include a power source or a connection to a power source for lighting a combination of one or more of lamps 210 selected by controller 212. Backup power source 204 (also referred to herein as secondary power source 204) may provide backup power to one or more of lamps 210 selected by controller 212 when primary power source 202 fails.

Switch 206 may re-route circuit paths from primary/secondary power sources 202/204 to lamps 210 such that secondary power source 204 provides power to lamps 210 when primary power source 202 fails. Primary power source 202 may be decoupled from lamps 210 upon primary power source 202 failure.

Emergency switch controller 208 may detect or determine operating condition (e.g., failure condition) of primary power source 202. When emergency switch controller 208 determines that primary power source 202 has failed, emergency switch controller 208 may reconfigure or signal switch 206, such that secondary power source 204 provides power to lamps 210.

In addition, when emergency switch controller 208 detects that primary power source 202 has recovered, emergency switch controller 208 may restore switch 206 to its configuration prior to the failure of power source 202, such that primary power source 202 provides power to lamps 210.

Lamp 210 may include, for example, one or more light emitting diode (LED) lamps, solid state lighting lamp, fluorescent lamp, plasma lamp, neon lamp, halogen lamp, multi-filament lamp, gas discharge lamp, incandescent lamp, arc lamp, etc.

Controller 212 may select and/or provide power from primary/secondary power source 202/204 to one or more of lamps 210. In addition, controller 212 may periodically reselect (e.g., every one hour, 24 hours, week, month, etc.) lamps 210 that are to receive power. For example, assume that N=2 (e.g., there are two lamps in PCML lighting fixture 100). Controller 212 may continuously and periodically switch power from lamp 210-1 to 210-2, and vice versa.

In some implementations, controller 212 may receive input from emergency switch controller 208. The input from emergency switch controller 208 may indicate whether there is, for example, an emergency (e.g., power failure), a periodic, manual- or auto-test, etc. In such a case, controller 212 may increase visibility of PCML lighting fixture 100, by lighting more than one lamp 210, by flashing one or more of lamps 210 lights, and/or by lighting one or more of lamps 210 at different intensities.

In other implementations, controller 212 may include a power throttling switch that gradually increases and/or decreases the load on the selected lamps 210 as controller 212 switches power back and forth between different combinations of lamps 210. In PCML lighting fixture 100, using the throttling switch may extend the life of lamps 210 by reducing degradations that are associated with sudden charge/discharge of power during conventional switching. Completely switching off a light source may keep the light source in a rest mode, therefore, preventing the light source from suffering further degradation.

In some implementations, controller 212 may include a processor that can be programmed to switch lamps 210 at a particular frequency (e.g., one hour to one year). In other implementations, a user/operator may also program particular combinations of lamps 210 to be lit in a particular sequence. For example, assume that N=4. Controller 212 may be programmed to light lamps 210-1 and 210-2 for a period of time (e.g., one day), then light lamps 210-2 and 210-3 the next day, and lamps 210-3 and 210-4 the following day, lamps 210-4 and 210-1 the next day, etc. In another example, controller 212 may be programmed to repeatedly cycle power to lamps 210-1, 210-2, 210-3, and 210-4 in sequence, such as every hour.

In one implementation, when one or more of lamps 210 fail, controller 212 may modify a particular sequence of lamps 210 that may be power cycled. For example, assume that controller 212 sequentially cycles power to lamps 210-1 through 210-4. When lamp 210-1 fails, controller 212 may cycle power to lamps 210-2 through 210-4, leaving out lamp 210-1 in the cycle.

In another example, assume that N=2. When lamp 210-1 fails, controller 212 may stop cycling power to lamps 210-1 and 210-2 and thereafter leave lamp 210-2 turned on or flashing. In such implementations, controller 212 may include a component for detecting failure of a particular lamp 210.

In another implementation, controller 212 may switch power through combinations of lamps 210 based on its synchronization to external events (e.g., pushing a test button on PCML lighting fixture 100, activation of a fire alarm/building alarm, activation of a remote controller, remote controller, failure of primary power source 202, etc.). In such cases, lamps 210 in PCML lighting fixture may flash at a visible frequency (e.g., every second) in response to the external event.

Depending on the implementation, controller 212 may include a mechanical device (e.g., mechanical timer switch), an electrical device, electronic device (e.g., solid state device), etc.

Figure 2B:
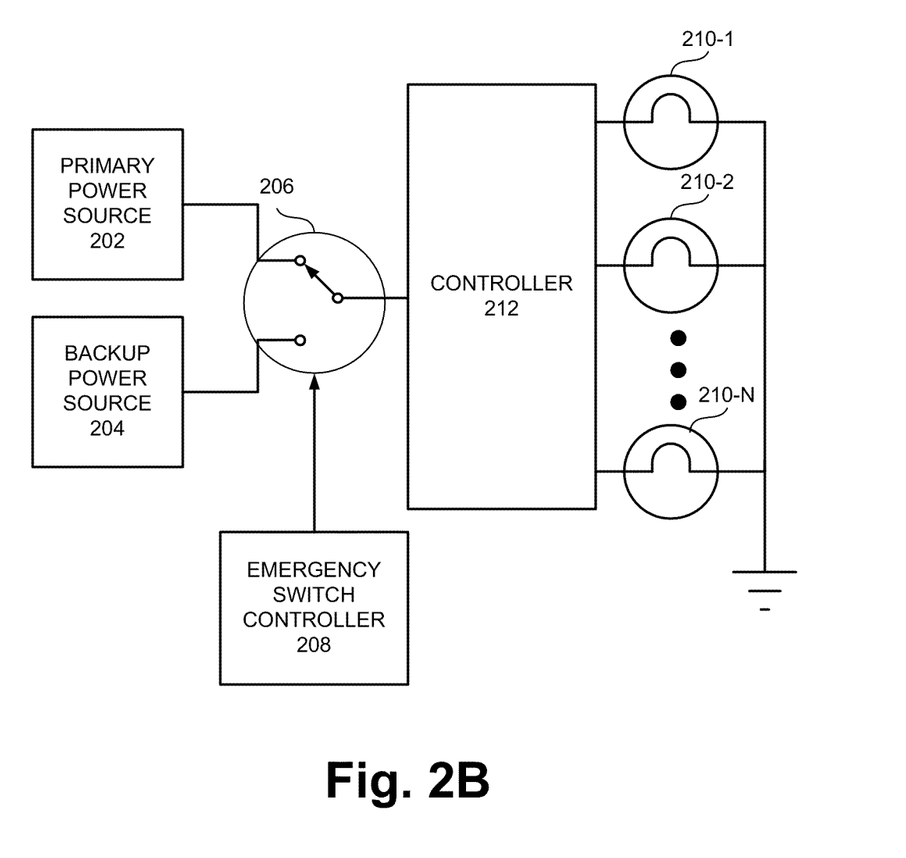
FIG. 2B is a diagram of exemplary functional components of the PCML lighting fixture of FIG. 1A according to another implementation.

FIG. 2B is a diagram of functional components 202 through 212 of PCML lighting fixture 100 according to another implementation. As shown, controller 212 may be positioned between primary/secondary power source 202/204 and lamps 210. In contrast, FIG. 2A shows controller 212 being coupled between lamps 210 and ground or a return power path.

Figure 2C:
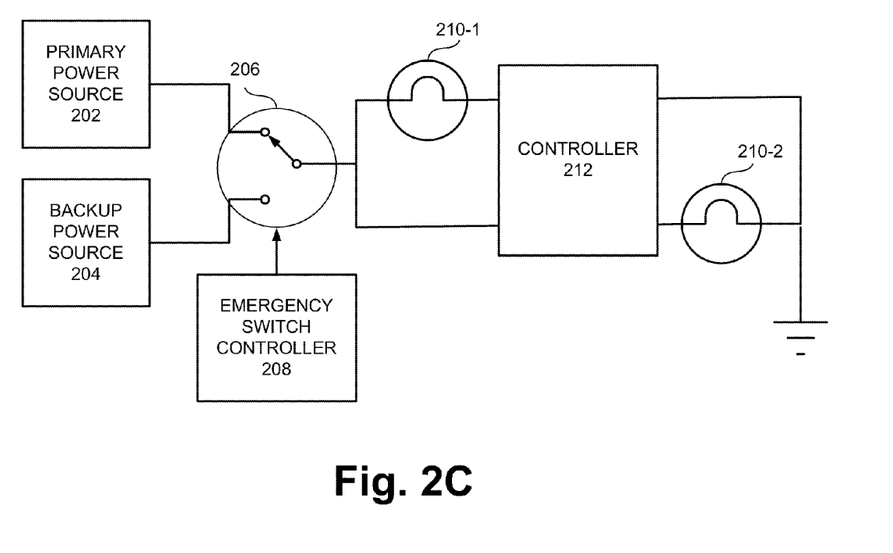
FIG. 2C is a diagram of exemplary functional components of the PCML lighting fixture of FIG. 1A according to yet another implementation.

FIG. 2C is a diagram of exemplary functional components of PCML lighting fixture 100 according to yet another implementation. In FIG. 2C, N=2 (e.g., two lamps 210-1 and 210-2), with controller 212 placed between lamp 210-1 and the ground (or a return power path) and between primary/secondary power source 202/204 and lamp 210-2.

Figure 2D:
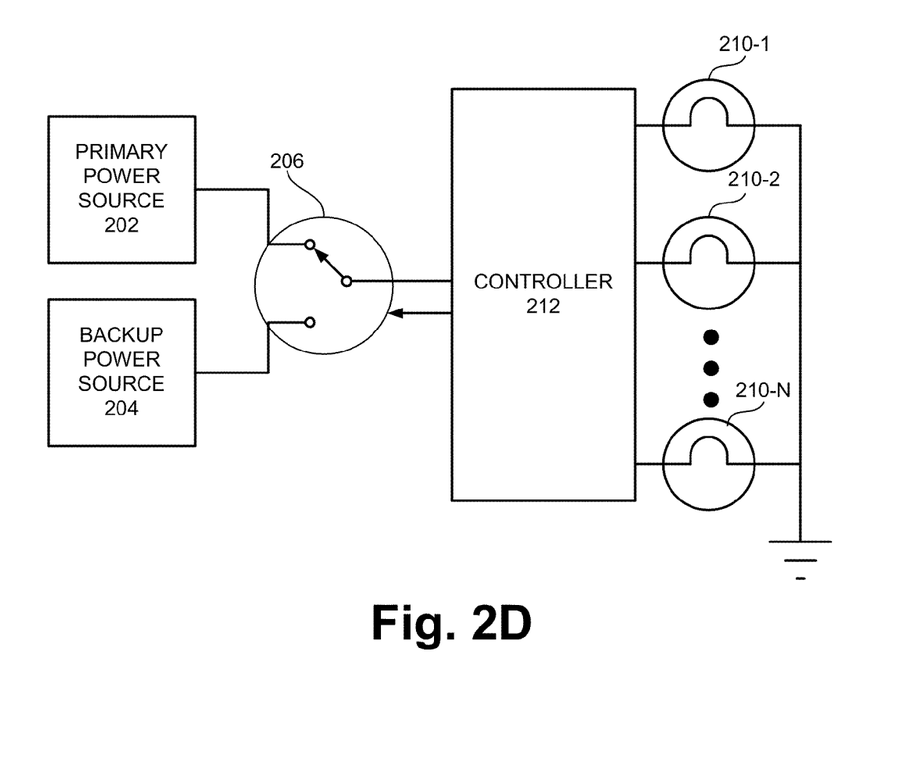
FIG. 2D is a diagram of exemplary functional components of the PCML lighting fixture of FIG. 1A according to still yet another implementation.

FIG. 2D is a diagram of exemplary functional components of PCML lighting fixture 100 according to still yet another implementation. As shown, controller 212 may be positioned between primary/secondary power source 202/204 and lamps 210. In addition, controller 212 in FIG. 2D may incorporate the functionality of emergency switch controller 208. The ground symbol may also represent a return power path.

Depending on the implementation, PCML lighting fixture 100 in FIGS. 2B through 2D may include additional, fewer, different, or different arrangement of components than those shown. For example, in some implementations, PCML lighting fixture 100 may not include backup power source 204, switch 206, and/or emergency switch controller 208.

Figure 3:
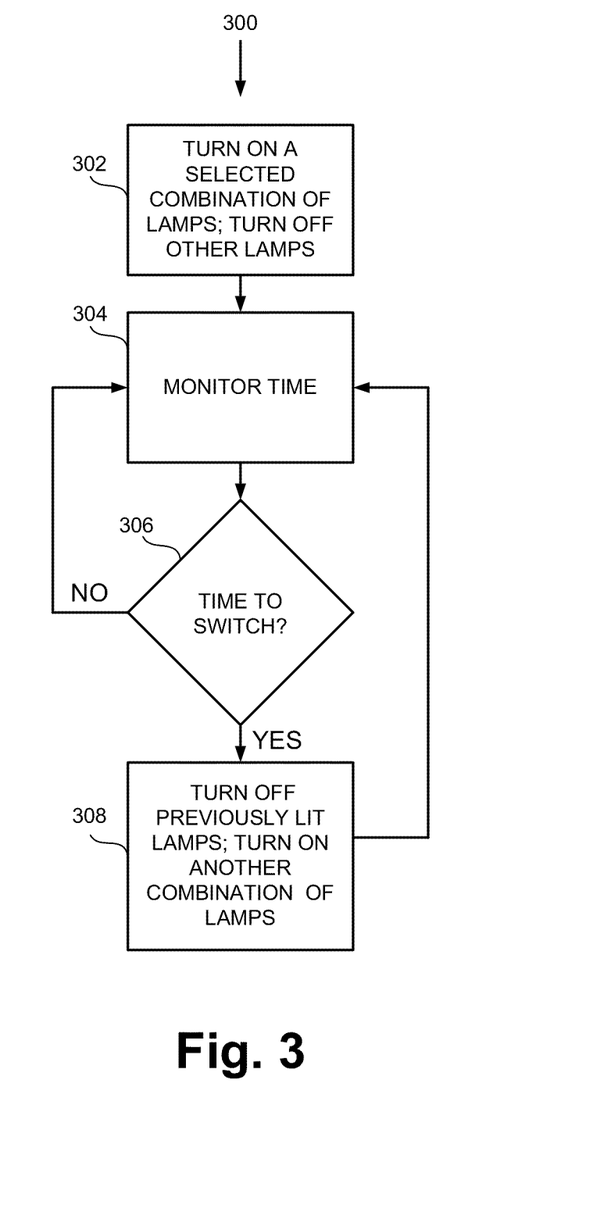
FIG. 3 is an exemplary process that is associated with operation of the PCML lighting fixture of FIG. 1A.

FIG. 3 is an exemplary process that is associated with operation of PCML lighting fixture 100. Process 300 may start with controller 212 turning on a selected combination (e.g., one or more) of lamps 210 and turning off other lamps 210 (block 302). As described above, in one implementation, a user/operator may program which lamps 210 may be lit/turned off in what sequence and/or the frequency of switching.

Controller 212 may monitor time (block 304). For example, controller 212 may monitor an internal clock (not shown). If the monitored clock indicates that a time for switching the combination of lamps 210 has not arrived (e.g., a particular increment of time for switching has not elapsed after the previous switching) (block 306—NO), process 300 may return to block 304. Otherwise (block 306—YES), controller 212 may turn off the previously lit lamps 210 and turn on another combination of lamps 210 in PCML lighting fixture 100.

Process 300 may then return to block 304, to continue to cycle through different combinations of lamps 210.

As described above, PCML lighting fixture 100 periodically and selectively switches power, in turn, to different combinations of one or more lamps 210. In contrast to lighting fixtures with irreplaceable lamps, when all of lamps 210 in PCML lighting fixture 100 fail, PCML lighting fixture 100 need not be thrown away, and lamps 2210 may be simply replaced. In addition, by using lamps 210, PCML lighting fixture 100 may extend the time for which PCML lighting fixture 100 stays lit, and therefore, may reduce the frequency of maintenance work (e.g., changing a light bulb) for PCML lighting fixture 100. PCML lighting fixture 100 may be less expensive to maintain than, for example, lighting fixtures that use special lamps designed for long life.

In a conventional multi-lamp lighting fixture, a lamp is lit when the previously lit lamp burns out or dims in intensity. In such a device, a particular lamp in the fixture may operate in a dimly lit or flickering state) for an extended period of time (e.g., during 40% of its rated life) until the lamp burns out or dims in intensity and the next lamp is lit. This may repeat for each of the lamps. However, the owner of the building in which the lighting fixture is installed may delay servicing the lighting fixture until all of the lamps fail. This may allow the lighting fixture to provide sub-standard lighting/signage. In contrast, PCML lighting fixture 100, by continuously cycling power through different combinations of lamps 210, may allow lamps 210 to degrade gracefully and gradually, before the next scheduled maintenance work.

In many instances, cycling between lamps may postpone the replacement of PCML lighting fixture 100, until when it is no longer economical to replace individual lamps 210. A light source (e.g., lamp 210) in PCML lighting fixture 100 may not need to be replaced when the light source fails, because another light source may extend the life of PCML light fixture 100.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

In addition, while series of blocks have been described with regard to exemplary processes illustrated in FIG. 3, the order of the blocks may be modified in other implementations. In addition, non-dependent blocks may represent acts that can be performed in parallel to other blocks.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A device comprising:
    a housing;
    a power source;
    two or more lamps for providing light; and
    a controller configured to:
        control, during a first sequence of a predetermined sequence, a delivery of power from the power source to a first combination of lamps, the first combination of lamps comprising at least one of the two or more lamps;
        control, during a second sequence of the predetermined sequence, a delivery of power from the power source to a second combination of lamps, the second combination of lamps comprising at least one lamp of the two or more lamps that is not part of the first combination of lamps, the predetermined sequence at least once repeating the first and second sequences, the first sequence occurring at times during the predetermined sequence that are different than times of occurrence of the second sequence;
        determine the presence of a deficient lamp of the first combination of lamps; and
        modify the predetermined sequence in a manner that removes the deficient lamp from the predetermined sequence.

2. The device of claim 1, further including an emergency lighting fixture, and wherein the deficient lamp is a lamp that no longer provides light or has a decrease in brightness.

3. The device of claim 2, wherein the emergency lighting fixture includes an exit sign.

4. The device of claim 1, wherein the two or more lamps include at least one of:
    a fluorescent lamp, plasma lamp, neon lamp, halogen lamp, multi-filament lamp, gas discharge lamp, incandescent lamp, light emitting diode (LED) lamp, or arc lamp, and further wherein the processor is configured to modify the predetermined sequence by permitting the supply of power to each lamp other than the deficient lamp of the first combination of lamps during subsequent occurrences of the first sequence of the predetermined sequence.

5. The device of claim 1, wherein the power source includes:
    a primary power source and a backup power source; and
    an emergency power switch for providing power from the backup power source to the two or more lamps when the primary power source fails.

6. The device of claim 5, wherein the controller is further configured to:
    repeatedly flash the two or more lamps after the primary power source fails; and
    increase intensities to each lamp of the second combination of lamps after the primary power source fails.

7. The device of claim 1, wherein the controller is further configured to:
    continuously provide power to each lamp of the second combination of lamps after determination of the presence of the deficient lamp.

8. The device of claim 1, wherein the controller includes a switch that gradually decreases power delivered to each of the two or more lamps that is illuminated when the predetermined sequence switches from one of the first and second sequences to the other of the first and second sequences.

9. The device of claim 1, wherein the controller is positioned between the power source and at least one of the two or more lamps.

10. The device of claim 1, wherein the controller is positioned between the two or more lamps and ground.

11. The device of claim 1, wherein power delivered during the first sequence is over a first time period, and power delivered during the second sequence is over a second time period, the first time period and the second time period being equal in duration.

12. A device comprising:
a first lamp and second lamp, the first and second lamps each being structured to be a source of light when supplied with power; and
a controller configured to:
control the timing of the supply of power to the first lamp during a first plurality of times of a sequence;
control the timing of the supply of power to the second lamp during a second plurality of times of the sequence, at least a portion of the first plurality of times being at different times than at least a portion of the second plurality of times;
determine when one of the first and second lamps becomes a deficient lamp; and
modify the sequence in a manner that removes the deficient lamp from the sequence to attain a modified sequence; and
execute the modified sequence.

13. The device of claim 12, wherein the controller is configured to determine when one of the first and second lamps is the deficient lamp based on a decrease or absence of illumination from the first lamp or second lamp, and further wherein the device includes a primary power source and a backup power source, the primary power source structured to deliver a power for the first and second lamps, the backup power source configured to provide backup power for the first and second lamps.

14. The device of claim 13, wherein the controller is further configured to, upon detection of the deficient lamp, provide continuous power to the other of the first lamp and second lamp.

15. The device of claim 13, wherein the controller is further configured to (1) increase an intensity of lighting of at least one of the first and second lamps after the primary power source fails; or (2) flash at least one of the first and second lamps intermittently after the primary power source fails.

16. The device of claim 12, wherein the first lamp includes a light emitting diode (LED).

17. The device of claim 12, wherein the controller includes a switch that gradually increases power delivered to the second lamp when the sequence switches from the first plurality of times to the second plurality of times.

18. The device of claim 12, wherein the duration of the first plurality of times is equal to the duration of the second plurality of times.

19. A method comprising:
determining an illumination sequence for a first lamp, a second lamp, and a third lamp, the illumination sequence establishing different timings of illumination for each of the first, second, and third lamps;
executing, by a processor, the illumination sequence;
detecting a deficient lamp of at least one of the first, second, and third lamps during the executed illumination sequence;
altering, by the processor, in response to detection of the deficient lamp, the illumination sequence, the altered illumination sequence at least bypassing the at least one of the first, second, and third lamps having the deficient lamp; and
executing, by the processor, the altered illumination sequence.

20. The method of claim 19, wherein executing the illumination sequence includes:
gradually reducing power used to illuminate one of the first, second, or third lamps when switching to illuminate a different one of the first, second, and third lamps; and
gradually increasing a brightness when at least initially illuminating the different one of the first, second, or third lamps.

21. The method of claim 19, wherein detecting the deficient lamp comprises determining a decrease in brightness of, or lack of illumination from, the deficient lamp.

22. The method of claim 19, further comprising:
controlling, by the controller, a supply to power to at least one of the first, second, and third lamps; and
controlling, by the controller, a supply of power to at least one of the first, second, and third lamps from a secondary power source when a primary power source fails.

* * * * *